United States Patent
Morimoto et al.

(10) Patent No.: US 8,014,644 B2
(45) Date of Patent: Sep. 6, 2011

(54) OPTICAL WAVEGUIDE, OPTICAL WAVEGUIDE MODULE AND METHOD FOR FORMING OPTICAL WAVEGUIDE

(75) Inventors: Masahito Morimoto, Tokyo (JP); Masao Shinoda, Tokyo (JP)

(73) Assignee: The Furukawa Electric Co., Ltd, Tokyo (JP)

(*) Notice: Subject to any disclaimer, the term of this patent is extended or adjusted under 35 U.S.C. 154(b) by 0 days.

(21) Appl. No.: 13/016,580

(22) Filed: Jan. 28, 2011

(65) Prior Publication Data

US 2011/0135261 A1  Jun. 9, 2011

Related U.S. Application Data

(63) Continuation of application No. 11/547,610, filed as application No. PCT/JP2005/006169 on Mar. 30, 2005, now abandoned.

(30) Foreign Application Priority Data

Apr. 5, 2004  (JP) ................... 2004-111211

(51) Int. Cl.
  *G02B 6/02*  (2006.01)
(52) U.S. Cl. .............. 385/123; 385/27; 385/39; 65/276; 65/281
(58) Field of Classification Search ............. None
  See application file for complete search history.

(56) References Cited

U.S. PATENT DOCUMENTS

| | | | |
|---|---|---|---|
| 4,389,090 A | 6/1983 | LeFevre | ........................ 385/11 |
| 4,444,460 A | 4/1984 | Stowe | ........................... 385/30 |
| 4,564,263 A | 1/1986 | Ueba et al. | ................... 385/143 |
| 4,812,001 A | 3/1989 | Tomita et al. | ................. 385/123 |
| 4,875,969 A | 10/1989 | Hsu et al. | ........................ 216/24 |
| 5,007,706 A | 4/1991 | Parker et al. | ................. 385/142 |
| 5,138,676 A | 8/1992 | Stowe et al. | |
| 5,452,393 A | 9/1995 | Stowe et al. | ................. 385/123 |

(Continued)

FOREIGN PATENT DOCUMENTS

AU       644680       1/1992

(Continued)

OTHER PUBLICATIONS

Akira Ohki, et al. "Development of 60 Gbps-class Parallel Optical Interconnection Module (ParaBIT-1F)", The Institute of Electronics Information and Communication Engineers Technical Report of IEICE, 2000, pp. 37-42 (with English Abstract).

(Continued)

*Primary Examiner* — Uyen-Chau N Le
*Assistant Examiner* — Chad H Smith
(74) *Attorney, Agent, or Firm* — Oblon, Spivak, McClelland, Maier & Neustadt, L.L.P.

(57) ABSTRACT

An optical waveguide comprising a core and a clad characterized in that a desired part is heated and transited to machining strain release state, the part transited to the machining strain release state is curved with a specified bending radius and transited to machining strain state. That part of the optical waveguide is heated to a temperature within a range between the bending point and softening point and transited to machining strain state. The optical waveguide is an optical fiber having the outer diameter not shorter than 50 μm. The optical waveguide has the outer diameter not shorter than ten times of the mode field diameter of the optical waveguide. The optical waveguide has a bending radius of 5.0 mm or less and difference equivalent of refractive index &Dgr;$_1$ between the core and clad falls within a range of 0.8-3.5%.

19 Claims, 4 Drawing Sheets

U.S. PATENT DOCUMENTS

| | | | |
|---|---|---|---|
| 5,486,947 A | 1/1996 | Ohishi et al. | 359/341.5 |
| 5,553,177 A | 9/1996 | Hering et al. | 385/31 |
| 6,295,398 B1 | 9/2001 | Gillham et al. | |
| 6,363,191 B1 | 3/2002 | Gillham et al. | |
| 6,612,753 B1 | 9/2003 | Cryan et al. | |
| 2002/0114594 A1 | 8/2002 | Kato et al. | |
| 2003/0165291 A1 | 9/2003 | Bhagavatula et al. | |
| 2004/0042754 A1 | 3/2004 | Arima et al. | |

FOREIGN PATENT DOCUMENTS

| | | | |
|---|---|---|---|
| AU | 8410691 A | 1/1992 |
| AU | 753632 A | 3/2000 |
| AU | 4467699 A | 3/2000 |
| AU | 5194100 A | 2/2001 |
| AU | 9720801 A | 7/2002 |
| BR | 9915716 A | 11/2001 |
| BR | 9915717 A | 11/2001 |
| CA | 2 315 435 A1 | 2/2001 |
| CA | 2315435 | 2/2001 |
| CN | 1285520 A | 2/2001 |
| DE | 69 131 615 T | 2/2000 |
| EP | 5 33 847 A | 12/1991 |
| EP | 0 989 427 A2 | 3/2000 |
| EP | 1 065 539 A2 | 1/2001 |
| EP | 1 076 251 A1 | 2/2001 |
| EP | 1 219 987 A1 | 7/2002 |
| ES | 2140394 T | 3/2000 |
| HK | 1014272 A | 12/2000 |
| JP | 5-508033 | 11/1993 |
| JP | 5-319843 | 12/1993 |
| JP | 2000-111736 | 4/2000 |
| JP | 2000-111737 | 4/2000 |
| JP | 2000-329950 | 11/2000 |
| JP | 2001-108859 | 4/2001 |
| JP | 2002-202429 | 7/2002 |
| JP | 2004-85920 | 3/2004 |
| TW | 449664 B | 8/2001 |
| TW | 455718 B | 9/2001 |
| TW | 457378 A | 10/2001 |
| WO | WO 91/20007 A1 | 12/1991 |

OTHER PUBLICATIONS

Takanori Shimizu, et al., "System LSI Module with Optical I/O Interfaces (3) Optical System Design", IEICE 2003 Electronics Society Convention C-3-125, p. 258.

Kenji Sasaki, et al., "System LSI Module with Optical I/O Interfaces (5) Deveropment of PETIT Connector", IEICE 2003 Electronics Society Convention C-3-127, p. 260.

OPTICAL WAVEGUIDE, OPTICAL WAVEGUIDE MODULE AND METHOD FOR FORMING OPTICAL WAVEGUIDE

CROSS REFERENCE TO RELATED APPLICATIONS

This application is a continuation of U.S. application Ser. No. 11/547,610, filed Apr. 17, 2007, which is a National Stage of PCT/JP2005/06169, filed Mar. 30, 2005, and claims the benefit of priority under U.S.C. §119 of Japanese Application No. 2004-111211, filed Apr. 5, 2004. The contents of U.S. application Ser. No. 11/547,610, filed Apr. 17, 2007, are incorporated herein by reference.

FIELD OF THE INVENTION

The present invention relates to miniaturization of optical components, particularly an optical waveguide, an optical waveguide module which can convert the optical waveguide direction at a minute size and a method for converting an optical waveguide direction.

BACKGROUND OF THE INVENTION

Now action speed of electric circuits is approaching that of optical transmission circuits. However a principle barrier to increase action speed of the electric circuits is higher than that to increase action speed of optical transmission circuits operational speed. This is because time constant due to static electric capacity associated with electric circuits increases by the high speed action. Therefore, research and development is actively conducted on fusion of electric circuit and optical circuit to partly compensate a high speed action of electric circuit with an optical transmission path.

Specifically, VCSEL (Vertical Cavity Surface Emitting Laser) is installed in an electric circuit substrate and light signal emitted there is injected into an optical fiber and optical waveguide to propagate, and the light signal is received with installed PD (Photodiode) to transmit. Studied is a method for embedding an optical fiber and an optical waveguide into an electric circuit substrate itself, and a method employing an optical fiber and an optical waveguide as substitute for an existing electric cord between plurality of electric circuit substrates. And, for example, an organic waveguide sheet (a polyamide waveguide sheet is a typical waveguide sheet) and an optical fiber sheet are proposed.

VCSEL is a surface emitting laser and the laser emits in a vertical direction with respect to the installed electric circuit substrate. When the electric circuit substrate is installed in a vertical direction, the laser emits in a parallel direction with respect to the electric circuit substrate. Such laser installation killing advantages of high-density multiple installation of VCSEL is not generally utilized.

Further, since the optical waveguide and the optical fiber which are embedded in the electric circuit substrate waveguide in parallel with the electric circuit substrate, 90 degree change of an optical waveguide direction is required to combine the laser emit from VCSEL with these optical waveguide and optical fiber.

With regard to such a method for changing 90 degree direction of optical waveguide, studied are a method comprising steps of grinding end surfaces of optical fiber and waveguide at 45 degree and forming mirror by subjecting metal vapor deposition to change 90 degree, and a method of changing with a mirror having 45 degree angle.

Further, it is different from necessity of 90 degree direction change of optical waveguide in application region, but for example with FTTH in which optical fibers are wired in users' houses, it is necessary to secure a space for gently bending optical fibers in room corners and hole portions through which the optical fibers pass from outside to inside the house general fibers can not be bent in less than several cms due to problems of mechanical characteristic and optical characteristic, thereby ended up spoiling interior arrangement and landscape. Correspondingly, optical fibers capable of being bent mechanically and optically even at the minimum bend radius of 15 mm have been developed recently.

Further, as an application of converting optical waveguide direction with ultraminiatur, a method of reducing the specified portion of the optical fiber into extremely minute diameter and bending it is proposed and commercialized. In this method in which the reduced portion of the optical fiber diameter is about several μm to 10 μm, even if this fine optical fiber is bent at a radius of 1 mm, a bend distortion due to the bend becomes not more than 1%, thereby the optical fiber can be sufficiently mechanically bent. Further although it is not a configuration where light is confined with fiber of this fine portion alone, a relation between light and environment (air) is referred to a relation between core and clad in combination of this fine optical fiber and its exterior environment, i.e. air. And it functions as a waveguide equivalently having ultra high equivalent refractive index difference of several tens % and even with a minute bend radius it can be bent without light loss.

Patent Reference 1: U.S. Patent publication No. 2203/0165291A1
Patent Reference 2: U.S. Pat. No. 5,138,676
Patent Reference 3: Japan Laid-open Unexamined Patent Publication 2000-329950
Non Patent Reference 1: Ohki et al. "Development of 60 bps Parallel Optical Interconnect Module (ParaBIT-IF)" IEICE 2000 Technical Report EMD2000-7)
Non Patent Reference 2: Shimizu et al. "Optical I/O Built-in System LSI module (3) Design of Optical Coupling System" IEICE 2003 Electronics Society Convention C-3-125
Non Patent Reference 3: Sasaki et al. "Optical I/O Built-in System LSI module (5) Development of Substrate implementation Connector Optical coupling System Design" IEICE 2003 Electronics Society Convention C-3-127

DISCLOSURE OF THE INVENTION

Problem to be Solved by the Invention

First, in the above mentioned method where end surfaces of the optical fiber and the waveguide are ground at 45 degree and a mirror is formed by subjecting the ground surface to metal vapor deposition to perform 90 degree conversion, it is not easy to highly accurately grind the optical fiber and the waveguide at 45 degree. And further step such as metal vapor deposition requires large-scale manufacturing facility. At implementation time, it also requires to install the 45-degree surface straight above or straight below with respect to the circuit substrate without fail. This implementation is not easy. Further in this method, after 90 degree conversion from the core of the optical fiber and the core of the waveguide, a beam diameter is increased because light waveguides in the medium having no waveguide structure, thereby good coupling is difficult to obtain.

Further in the method of converting with a mirror having 45 degree which requires a minute mirror for miniaturization, components including lens parts are added for positioning with this minute mirror and for controlling beam expansion caused by beam propagation in the air before the mirror portion. Therefore the number of components is increased and positioning them is not easy.

Furthermore, in the system associated with interspaces propagation in which end surfaces of light emission to the space from the waveguide and the optical fiber take big return loss, no reflection coating and angle grinding are required. No reflection coating requires large scale equipment, and as for angle grinding, positioning with 45 degree mirror is further difficult in some cases because optical beam radiation direction deviates from the optical axis in the waveguide and optical fiber.

Next, an optical fiber capable of bending mechanically and optically even with the minimum bend radius of 15 mm is effective outdoor while in the narrow indoor space, allowable smaller bending radius is much better. In the case the radius smaller than the bending radius of 15 mm is desired, it is impossible to use.

In the method of bending where the specified portion of the optical fiber having minute radius, because the outer diameter is extremely thin, about several μm, there is a problem of breakage during handling. Further in this method, a return loss of the bend portion is sensitive to the external environment change because basically the external environment functions as a clad. That means, when water dew condensation occurs in this minute diameter portion because of an environmental temperature and a temperature change, optical confinement in the minimum bending portion due to pseudo ultra high Δ does not work.

In order to maintain optical confinement in the minimum bending portion, this minute diameter portion requires air sealing while being exposed to gas including air. That means, the minute diameter portion requires air sealing by disposing in the cavity, but this is not easy. Further, even if the minute diameter portion is small, the structure portion air sealing and protecting it has to be larger than the minute diameter portion.

In addition, organic waveguide sheets and optical fiber sheets are proposed as the above mentioned optical fibers and optical waveguides. First, an optical loss of state of art organic waveguide sheets is about 0.2 dB/cm which is very large, and optical power loss is 3 dB with only 15 cm transmission, i.e. less than half. When optical signals transmit from an optical electric fusion bonded substrate to a back plane, further to another optical electric fusion bonded substrate, the optical signals transmit for a distance ranging from several tens cms to 1 m. In this case, even with transmission loss alone of the waveguide regardless of a connection loss and the like of a coupler, an optical loss of maximum about 20 dB occurs. Therefore, when optical transmission is conducted using a state or art organic waveguide, the transmission is ended up limited to a short distance transmission. Further, characteristics of the organic waveguides are changeable to temperature. And long term reliability in the condition of high temperature and high humidity as in the electric circuit is lower than that of the optical fiber.

On the contrary, an optical fiber sheet is wired with multiple optical fibers sandwiched with flexible plastic films and characteristics are determined by the optical fiber. With regard to a transmission loss of the optical fiber, a silica glass optical fiber is about 0.2 dB/km while the organic waveguide is 0.2 dB/cm. Transmission loss of the silica glass optical fiber is remarkably small in terms of cm and km. And the transmission distance within the optical electric circuit fusion bonded substrate is several ms at maximum, therefore the transmission loss is negligible small. In the case of plastic optical fiber, the transmission loss is increased several dB to several tens dB/km. For example even with 500 dB/Km loss, the loss is also low about 1/40 compared with the organic waveguide of about 0.5 dB/m. Therefore there are no substantial problems.

However, in this optical fiber sheet where multiple optical fibers are wired with lights in the specified place, wired lights are crossed and optical loss occurs depending on the crossing. The wiring configuration prevents the light losses due to this crossing. A buffer material is considered to use in the crossing portion, but this measure affects yield rate and leads to cost up. And there is a problem with the wiring on the sheet that the bending radius can not be reduced because the optical fiber is optically and mechanically strong.

Generally since optical loss increase and mechanical breakage are concerned in the silica glass optical fiber at bending radius of not more than 15 mm, wiring at the radius more than that is required. Therefore optical fiber is difficult to make small and wiring configuration is also limited. With regard to mechanical strength of the optical fiber sheet using the silica glass optical fiber, e.g. Japan Patent Unexamined Publication 2000-329950 proposes using a carbon coat fiber in which the optical fiber surface is coated with carbon. However it has had a problem that surface of the carbon coated optical fiber is dark and the color can not be discriminated even if this fiber is covered and colored.

In the case of preparing optical electric fusion bonded substrate which is embedded with an optical fiber sheet in an electric circuit substrate, the optical fiber generates microbendloss caused by unevenness of the electric circuit substrate surface. It is easy to understand if we consider that small unevenness hits the surface of the optical fiber to produce lateral pressure so that minute bends continuously generate in a longitudinal direction of the optical fiber. Such microbendloss occurs in some cases when temperature of a single unit of optical fiber sheet is lowered. A flexible plastic film forming the sheet contracts at low temperature, the optical fiber contracts a little because it is a glass, and the optical fiber surges finely due to difference between contract lengths.

The present invention is made to solve the above mentioned objects. The object is to provide an optical waveguide, optical waveguide module and a method of converting optical waveguide direction, wherein the number of components is small, positioning is not required, the optical waveguide direction is converted with extremely small portion, special protection mechanism such as air sealing is not required because it is not sensitive to external environment change.

Means for Solving Problems

The inventor has been dedicated to studying to solve the conventional object. As a result, it is found that a specified portion of an optical waveguide is heated to the specified temperature so that the portion of the optical waveguide becomes in a process distortion free state and bending process is preformed at a specified bending radius while keeping the state, thereby capable of bending in a distortion free state.

The present invention is made based on the above-mentioned research accomplishment and a first embodiment of an optical waveguide related to the present invention is the optical waveguide wherein an optical waveguide having a core and a clad, and a specified portion is heated to move into a process distortion free state, said portion moved into the process distortion free state is bent in a curved line at a specified bend radius to move into a process distortion state.

In a second embodiment of an optical waveguide related to the present invention, said portion of said optical waveguide is heated to a temperature within a range of not less than a folding point to not more than softening point to move the process distortion state.

In a third embodiment of an optical waveguide related to the present invention, said optical waveguide is an optical fiber having an outer diameter of 50 μm. Material of the optical fiber includes silica glass, all plastic, and plastic clad.

In a fourth embodiment of an optical waveguide related to the present invention, an outer diameter of said optical waveguide is not less than 10 times of mode field diameter of said optical waveguide.

In a fifth embodiment of an optical waveguide related to the present invention, said bend radius is not more than 5.0 mm.

In a sixth embodiment of an optical waveguide related to the present invention, a core/clad equivalent refractive index difference $\Delta_1$ of the optical waveguide is within a range from not less than 0.8% to not more than 3.5%, preferably within a range from not less than 1.0% to not more than 3.0%. The equivalent refractive index difference is a difference between the maximum refractive index of the core portion and the minimum refractive index of the effective clad portion. And a profile of optical fiber refractive index includes a single-peaked type profile and a W-type profile, etc. and the profile is not especially limited.

A first embodiment of an optical waveguide module related to the present invention comprises multiple optical waveguides mentioned above and said multiple optical waveguides are arrayed and at least some part of said optical waveguides is fixed to a member comprising a positioning mechanism.

A second embodiment of an optical waveguide module related to the present invention comprises multiple optical waveguides mentioned above and to at least one end of said optical waveguide, an optical waveguide having an core/clad equivalent refractive index difference $\Delta_2$ of not less than 0.2% is fusion bonded, the fusion bonded portion is heated to reduce mismatch of said core/clad equivalent refractive index differences $\Delta$ and mismatch of mode field diameters.

A third embodiment of an optical waveguide module related to the present invention comprises any one of optical wave guides mentioned above, wherein said optical waveguide is fixed on a sheet while being wired on the sheet.

A fourth embodiment of an optical waveguide module related to the present invention comprises any one of optical wave guides mentioned above, wherein said optical waveguide is fixed between at least two sheets while being wired therebetween.

A fifth embodiment of an optical waveguide module related to the present invention comprises multiple optical waveguides for use and they are fixed while being wired.

In a sixth embodiment of an optical waveguide module related to the present invention, a material of said sheet for use has flexibility. As this material, used films are polyamide, polyethylene terephthalate, low-density or high-density polyethylene, polypropylene, polyester, nylon 6, nylon66, ethylene-tetrafluoroethylene copolymer, poly 4-methyl venten, polyvinylidene chloride, plastic polyvinyl chloride, polyetherester copolymer, ethylene-vinyl acetate copolymer, soft polyurethane, etc.

In a first embodiment of a method of forming optical waveguide related to the present invention, a method of forming an optical waveguide comprising steps of:
heating a specified portion of an optical waveguide;
moving said portion of said optical waveguide into a process distortion free state;
bending said portion moved into the process distortion free state at a specified bend radius; and
moving said portion of said optical waveguide into a process distortion state while being bent at the specified bend radius. Here an optical fiber is used as the optical waveguide, and all plastic or plastic clad used as material enables small bending without bend loss. Besides, an operation at high temperature is not required not as in the silica glass optical fiber.

Effect of the Invention

With the optical waveguide of the present invention, the specified portion is bent at the specified radius while reducing connection loss caused by fusion bonding to convert the optical waveguide direction to the specified angle. Further miniaturization of the optical waveguide module is realized using these.

EXPLANATION OF REFERENCE NUMERALS

1 Optical Fiber
2 Arc Discharge
3 Electrode
4 Specified Portion
5 Positioning Mechanism
6 Member
7 Fusion Bonding Portion
8 Sheet
9 Window
10 Optical Waveguide Module
11 Electric Optical Circuit Fusion Substrate

DESCRIPTION OF THE PREFERRED EMBODIMENTS

Embodiments of the present invention will be described in detail with reference to drawings hereinafter.

First Embodiment

Figure 1:
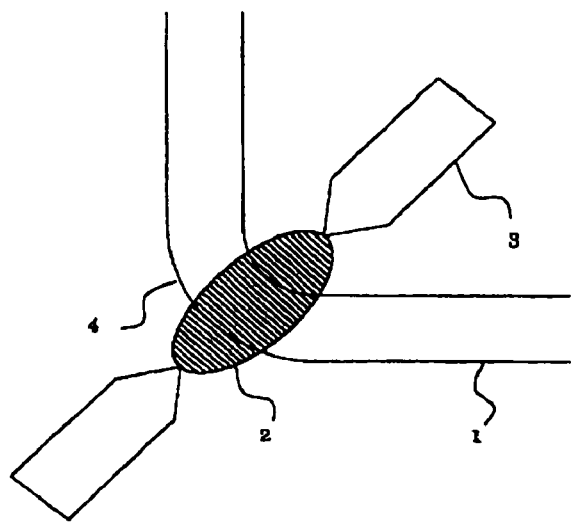
FIG. 1 is a schematic diagram showing an optical waveguide bent by using arc discharge.

FIG. 1 is a schematic diagram showing a first mode of an optical waveguide related to the present invention. The specified portion of the optical waveguide is heated by arc discharge to high temperature (more than holding point, less than softening point) and the optical waveguide is bent at a prescribed radius). Since this optical waveguide becomes in a thermoneutral environment after the bent portion of the optical waveguide is bent at high temperature, there is no distortion due to bent. That means it is processed in such that an initial state is a bend state. When the optical waveguide is deformed after processed state, distortion occurs to cause breakage. When the optical waveguide is bent before the process, distortion does not occur to prevent breakage.

However, when this bent portion is restored to linear state, distortion occurs to cause breakage. Selection whether an initial distortion free state is a linear state or a bent state ends up preventing breakage when required forms are made. Since the present invention is purposed to convert the optical waveguide direction in the minute space, breakage is prevented by the process in such that a conversion state is the initial distortion free state.

When this process is performed, the required portion of the optical waveguide may be heated by any means including arc discharge, burner, furnace, etc., but the purpose is bending at the same time of heating while freeing process distortion.

Second Embodiment

Figure 2:
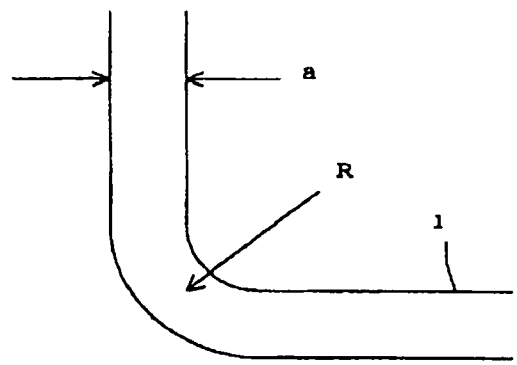
FIG. 2 is a schematic diagram showing a third and a fifth modes of an optical waveguide related to the present invention

FIG. 2 is a schematic diagram showing third and fifth modes of an optical waveguide related to the present invention. In these modes where an optical waveguide direction is converted at a minute space, actually usable size is specified based on physical size of the used optical waveguide. In these modes, an external diameter a of the optical waveguide is not less than 50 μm, and a bend radius R is not more than 5.0 mm. That means, it is not physically possible that an optical waveguide with an external diameter a of 50 μm is bent at a bend radius R of 50 μm. It is neither easy to handle an optical waveguide with an external diameter a of less than 50 μm. Therefore, the minimum external diameter a of an optical waveguide is specified 50 μm to secure easy handling and the bend radius of used optical waveguide is specified 10 times of the minimum external diameter to physically realize the bend.

Further, since 125 μm of external diameter is convertible diameter with the typical optical waveguide generally used, applied scope of the present invention is remarkably broaden by employing this external diameter. Furthermore, a method of the present invention is advantageous to employ with not more than 5.0 mm of the bend radius R. That means, when using an optical fiber having the minimum diameter at a bend radius R exceeding 5.0 mm, breakage distortion is not reached depending on the bend radius and distortion free process of the present invention is not required in some cases. While, in the case of not more than 5.00 mm of bend radius R, distortion free process of the present invention is required even with an optical waveguide having 50 μm of the minimum external diameter R which is not difficult to handle.

In this embodiment, an optical fiber having an external diameter a of 80 μm is bent at 90 degree with a bend radius R of 1 mm.

Third Embodiment

Figure 3:
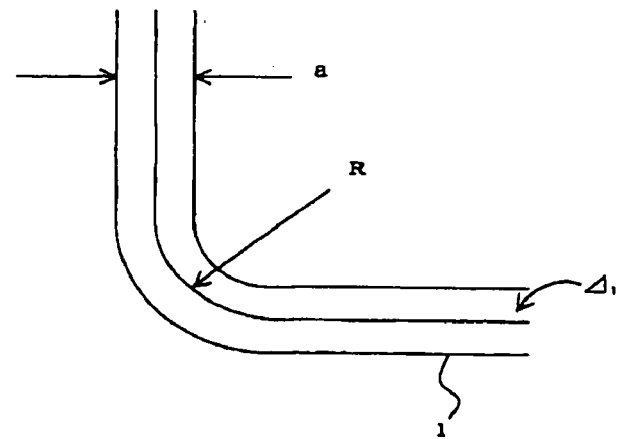
FIG. 3 is a schematic diagram showing a sixth mode of optical waveguide related to the present invention.

FIG. 3 is a schematic diagram showing sixth mode of optical waveguide related to the present invention. A method for preventing mechanical breakage is focused in the optical waveguide direction in the minute space according to the second embodiment. However in this embodiment the optical waveguide direction can be converted in the minute space while maintaining optical characteristics in good condition.

An equivalent refractive index difference $\Delta_1$ between core and clad of the optical waveguide is within a range from not less than 0.8% to not more than 3.5%, preferably within a range from not less than 1.0% to not more than 3.0%. In the generally used optical waveguide, an general difference $\Delta_1$ between the core and the clad is around 0.3%. However, when the optical waveguide having an equivalent refractive index difference $\Delta_1$ of about 0.3% is bent at bend radius R of not more than 5.0 mm, light confined in the core is not confined any more and is radiated to the clad, thereby drastically increasing light loss at the bending portion.

However, even though an equivalent refractive index difference $\Delta_1$ is within a range from not less than 0.8% to not more than 3.5%, preferably within a range from not less than 1.0% to not more than 3.0%, and a bend radius R is 0.5 mm, it is possible to hold the light loss at the bending portion under 0.5 dB. With high equivalent refractive index difference $\Delta_1$ exceeding 3.5%, it is possible to make bend loss lower even with bend radius of not more than 0.5 mm. In this case, since a mode field diameter is required to minimize in order to maintain a single mode operation, external connection is difficult. Therefore, preferable is an equivalent refractive index difference $\Delta_1$ within a range from not less than 1.5% to not more than 3.5%.

In this embodiment, an optical fiber with an equivalent refractive index difference $\Delta_1$ of 2.5% is used to bend at 90 degree an optical waveguide assumed to have an external diameter a of 80 μm and a bend radius R of 1 mm. A used wavelength is 1.3 μm.

Embodiment 4

Figure 4:
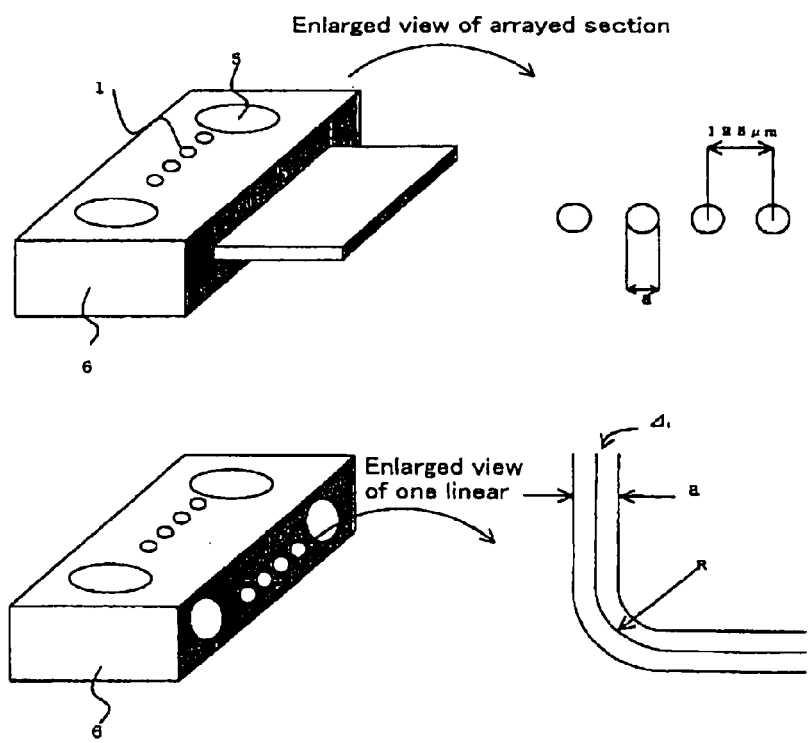
FIG. 4 is a schematic diagram showing an optical waveguide module in which arrayed optical waveguides are fixed to a member.

FIG. 4 is a schematic diagram showing a first mode of the optical waveguide module related to the present invention. In this mode optical waveguide module, the optical waveguides of the present invention are arrayed and multiple channels can be collectively converted in. The module of the present invention has an entrance portion where characteristics of an optical waveguide are compatible with those of the general optical waveguide enables good characteristic connection with external equipment.

In this embodiment, the optical fiber having an external diameter a of 80 μm, and equivalent refractive index difference $\Delta_1$ of 2.5% is fixed to the member comprising a positioning mechanism. The optical waveguide direction is converted from input to output at 90 degree and grind end faces of both input and output are inclined and ground at every 4 degree against 90 degree faces. Twelve horizontal linear lines are spaced at 125 μm intervals.

Fifth Embodiment

Figure 5:
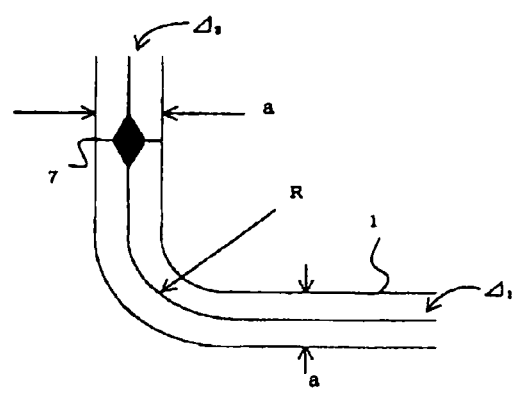
FIG. 5 is a schematic diagram showing a second mode of the optical waveguide module related to the present invention.

FIG. 5 is a schematic diagram showing second mode of the optical waveguide module related to the present invention. In this mode optical waveguide module, fusion bonded are the first optical waveguide having a core/clad equivalent refractive index difference $\Delta_1$ within a range from not less than 0.8% to not more than 3.5%, preferably within a range from not less than 1.0% to not more than 3.0%, and the second optical waveguide having an core/clad equivalent refractive index difference $\Delta_2$ of not less than 0.2%. The fusion bonded portion is heated to reduce mismatch of said core/clad equivalent refractive index differences $\Delta$ and mismatch of mode field diameters and the required portion of the optical waveguide is heated to bend.

That means, in the second mode optical waveguide module, the optical waveguide and general optical waveguide are different in core/clad equivalent refractive index in order to use the optical waveguide having a high equivalent refractive index difference. Further, since they are also different in equivalent refractive index difference, a mode field diameter of the general optical waveguide is different from that of the optical waveguide of the present invention used in an optical waveguide direction converting member. Those having different refractive indexes are contacted with each other and a light signal is transmitted through the contact portion to reflect light in a portion of refractive index boundary. This phenomenon should be avoided in the optical communication. Generally, not less than 50 dB is required as a reflection attenuation amount.

When those having different mode field diameters are connected with each other, connection loss due to diameter difference occurs in the connected portion. The mode field diameter of the optical waveguide used in the optical waveguide direction converting member of the present invention is about 3 µm, while the mode field diameter of the general optical waveguide depending on used wavelength is about 10 µm. If those having different diameters are connected with each other leaving as they are, the connection loss is not less than 5 dB. It is effective to facilitate connection of external equipment and laser that the general optical fiber and external equipment are connected and then they are connected to the optical waveguide converting member of the present invention.

In the second mode, in order to reduce loss of connection and reflection, fusion bonded are the first optical waveguide having a core/clad equivalent refractive index difference $\Delta_1$ within a range from not less than 0.8% to not more than 3.5%, preferably within a range from not less than 1.0% to not more than 3.0% and the second optical waveguide having an core/clad equivalent refractive index difference $\Delta_2$ of not less than 0.2%. The fusion bonded portion is heated to reduce mismatch of said core/clad equivalent refractive index differences $\Delta$ and mismatch of mode field diameters, thereby increasing reflection attenuation and restricting connection loss. In this method, a reflection attenuation is not less than 50 dB and a connection loss is about 0.2 dB.

In this embodiment, used is an optical fiber with an outer diameter a of 80 µm, a bend radius R of 1 mm, and an equivalent refractive index difference $\Delta_1$ of 2.5% for bending 90 degree and in a single optical waveguide mode by using wavelength. And, at one side of this optical fiber, an optical fiber with outer diameter a of 80 µm and an equivalent refractive index difference $\Delta_2$ of 0.35% and in a single optical waveguide mode by using wavelength is fusion bonded, the fusion bonded portion is heated with gas burner to reduce mismatch of the equivalent refractive index differences $\Delta$ and mismatch of mode field diameters. Using wavelength is 1.3µ. Measurement result is a reflection attenuation amount is 50 dB and connection loss is 0.2 dB.

Sixth Embodiment

Figure 6:
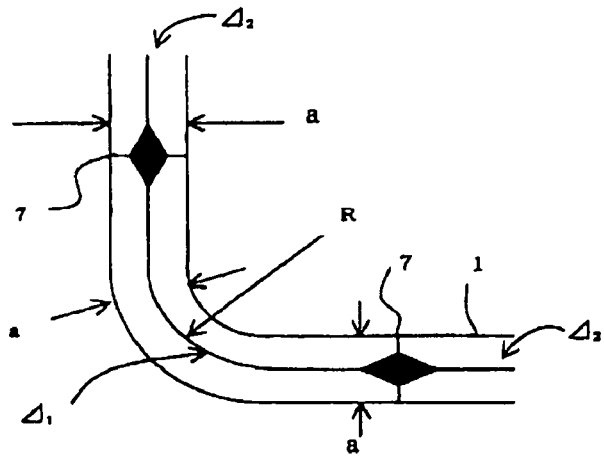
FIG. 6 is also a schematic diagram showing the second mode of the optical waveguide module related to the present invention.

FIG. 6 is also a schematic diagram showing the second mode of the optical waveguide module related to the present invention.

In this mode of the optical waveguide module, at both ends of the first optical waveguide having an core/clad equivalent refractive index difference $\Delta_1$ within a range from not less than 0.8% to not more than 3.5%, preferably within a range from not less than 1.0% to not more than 3.0%, the second optical waveguide having a core/clad equivalent refractive index difference $\Delta_2$ of not less than 0.2% is fusion bonded. And the fusion bonded portion is heated to reduce mismatch of said core/clad equivalent refractive index differences $\Delta$ and mismatch of mode field diameters, and the required portion of the optical waveguide is heated to bend.

In the fifth embodiment, the optical waveguide characteristically compatible with general optical waveguides is fusion bonded at only one side of the optical waveguide direction converting member, and the bonded portion is heated to r mismatch of said core/clad equivalent refractive index differences $\Delta$ and mismatch of mode field diameters. While, in the sixth embodiment, the optical waveguide characteristically compatible with general optical waveguides is fusion bonded at both ends of the optical waveguide direction converting member and the fusion bonded portion is heated to mismatch of said equivalent refractive index differences $\Delta$ and mismatch of mode field diameters. Thereby both sides of the optical waveguide direction converting member are easy to connect with the external equipment.

In this embodiment, used is an optical fiber with an outer diameter a of 80 µm, a bend radius R of 1 mm, and an equivalent refractive index difference $\Delta_1$ of 2.5% for bending 90 degree and in a single optical waveguide mode by using wavelength. And, at both sides of this optical fiber, an optical fiber with outer diameter a of 80 µm and an equivalent refractive index difference $\Delta_2$ of 0.35% and in a single optical waveguide mode by using wavelength is fusion bonded, the fusion bonded portion is heated with gas burner to reduce mismatch of the equivalent refractive index differences $\Delta$ and mismatch of mode field diameters. Using wavelength is 1.3µ. Measurement result is a reflection attenuation amount is more than 50 dB and connection loss is about 0.4 dB.

Seventh Embodiment

Figure 7:
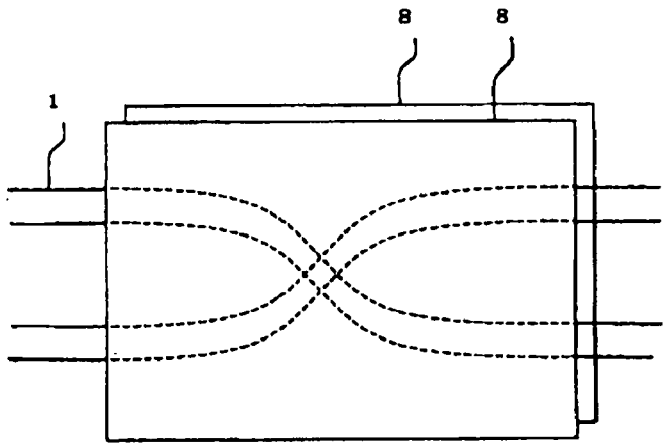
FIG. 7 is a schematic diagram showing an optical fiber sheet.

FIG. 7 is a schematic diagram showing an optical waveguide module of fourth to sixth mode. In the present invention, an optical waveguide module is prepared to have an optical waveguide installed in the sheet having an core/clad equivalent refractive index difference $\Delta_1$ within a range from not less than 0.8% to not more than 3.5%.

This embodiment uses an optical fiber having general diameters, a glass portion outer diameter of 125 µm, and a coating outer diameter of 250 µm, while it uses an optical waveguide having a remarkably big core/clad equivalent refractive index difference $\Delta_1$ of 2.5% compared to the general equivalent refractive index difference $\Delta_1$ of about 0.3% in the single mode optical fiber.

With the optical waveguide module prepared using this optical fiber which has relatively big equivalent refractive index difference $\Delta_1$ compared to the general equivalent refractive index difference $\Delta_1$ of the single mode optical fiber, losses are reduced even if the optical waveguide module is applied with surge and bend. Specifically, a loss fluctuation test is conducted at a temperature cycle from −40° C. to +80° C. while the optical waveguide module having general optical fiber is being sandwiched and pressed by two sheets of sandpaper. The test result that the loss is maximum of 20 dB at −40° C. is extremely bad. According to the result of the test which is conducted with the optical waveguide module in the same conditions but an equivalent refractive index difference $\Delta_1$ of 2.5%, the maximum loss fluctuation value is about 0.1 dB at the temperature cycle from −40° C. to +80° C. and loss fluctuation is hardly found.

Even in the case that the equivalent refractive index difference $\Delta_1$ is decreased to 1.5%, the loss fluctuation in the above mentioned test is also about 0.1 dB. However, with the lower equivalent refractive index difference $\Delta_1$, the loss fluctuation gradually increased, and with the equivalent refractive index difference $\Delta_1$ of 1%, the loss fluctuation of the above mentioned test becomes maximum about 0.5 dB. There are no practical problems even with 0.5 dB. The optical waveguide module of the present invention uses an optical waveguide direction converting element of the prior art connected thereto to realize an electric optical fusion circuit substrate having excellent optical transmission characteristic and connection characteristic. Therefore, in view of connectivity with the optical waveguide direction converting element of the prior art, the equivalent refractive index difference $\Delta_1$ is specified to be the minimum value of not less than 1.5% which is used in the optical waveguide direction converting element of the prior art.

Further, with bigger equivalent refractive index difference $\Delta_1$, the loss fluctuation decreases. With excessively big equivalent refractive index difference $\Delta_1$, a mode field diameter in the optical fiber decreases. In view of a high position accuracy at the connection time and connectivity with the optical waveguide direction converting element of the prior art, $\Delta_1$ is set not more than 3.5%.

A small outer diameter a of the glass portion enables mechanically small bend. However, with excessively small diameter, light confined in the core emits due to thin clad to generate transmission loss. Therefore, the clad outer diameter is set to be at least 10 times of the mode field diameter to control this transmission loss.

Further, being thin makes weak for the loss fluctuation test at the temperature cycle form −40° C. to +80° C. which is conducted in this embodiment. However in the fiber with mode field diameter of 5 μm having an optical fiber diameter a of 50 μm with an equivalent refractive index difference $\Delta_1$ of not less than 1.5%, the maximum loss fluctuation is about 0.1 dB and it is confirmed that excellent characteristic is maintained.

Eighth Embodiment

Figure 8:
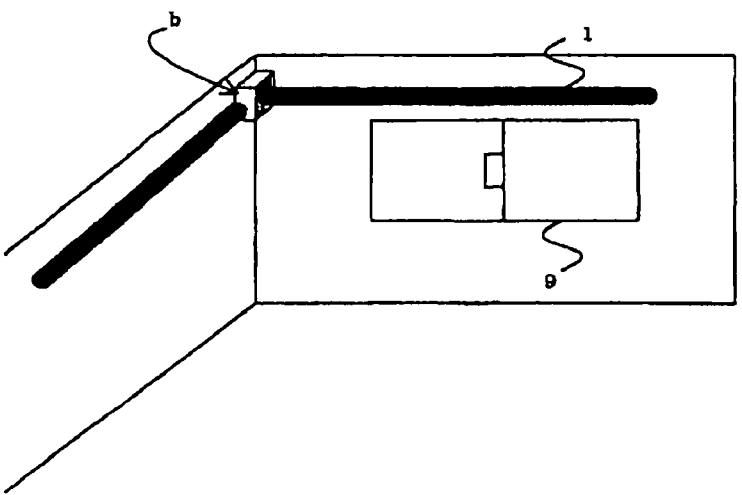
FIG. 8 is a schematic diagram showing application of the optical waveguide module to a corner wiring in the house.

FIG. 8 is a schematic diagram showing application of the optical waveguide module of the present invention to a corner wiring in the house. Wiring of the optical waveguide in a room corner in the house used to need to secure several cms for the minimum bend radius of the conventional optical waveguide. However, the optical waveguide module of the preset invention came to enable the corner wiring in a size of not more than 1 cm as a module size. FIG. 8 shows it is possible to bend at 90 degree.

Figure 9:
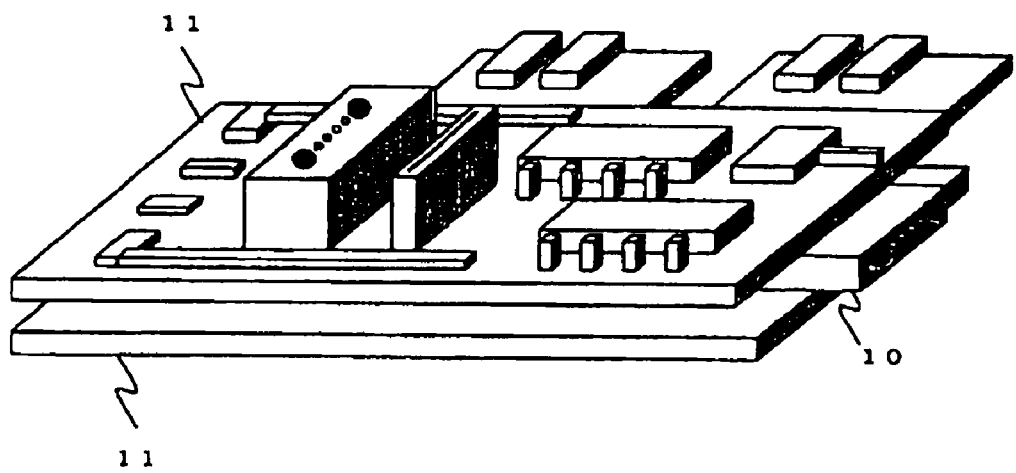
FIG. 9 is a schematic diagram showing application of the optical waveguide module to an electric optical circuit fusion substrate.

FIG. 9 is a schematic diagram showing application of the optical waveguide module of the present invention to an electric optical fusion circuit substrate. The electric optical fusion circuit substrate has a configuration in which an optical waveguide module is sandwiched with two sheets of electric circuit substrates, and the optical waveguide module of the present invention is installed at the ends of optical waveguide direction converting member at 90 degree to the electric circuit substrates.

With optical waveguide related to the present invention, the specified portion is bent at the specified radius while reducing connection losses due to the fusion bonding, thereby the optical waveguide can be converted at the specified angle. Further, with those, a size of the optical waveguide can be reduced and utility value in industry is increased.

The invention claimed is:
1. An optical waveguide comprising:
   a silica glass optical fiber having a core and a clad providing a core/clad equivalent refractive index difference within a range from not less than 0.8% to not more than 3.5% and having an outer diameter of 50 micrometers or more than 50 micrometers; and
   a bend provided in a specified portion of the silica glass optical fiber, said bend having a specified bend radius and being in an initial distortion free state and having said core/clad equivalent reflective index difference,
   the specified bend radius is smaller than a radius of a fracture limit of the silica glass optical fiber at a room temperature.
2. The optical waveguide according to claim 1, wherein said bend provided in an initial distortion free state results from said silica glass optical fiber being heated to a temperature within a range of not less than a folding point to not more than a softening point of the silica glass optical fiber when the bend is formed.
3. The optical waveguide according to claim 1, wherein an outer diameter of the said silica glass optical fiber is not less than 10 times a mode field diameter of said optical waveguide.
4. The optical waveguide according to claim 1, wherein said bend radius is not more than 5.0 mm.
5. An optical waveguide module comprising:
   multiple optical waveguides each being configured as recited in claim 1, wherein said multiple optical waveguides are arrayed; and
   a member, at least some part of said optical waveguides being fixed to the member, and the member comprising a positioning mechanism.
6. An optical waveguide module comprising:
   an optical waveguide configured as recited in claim 1;
   another optical waveguide bonded to at least one end of said optical waveguide and having an core/clad equivalent refractive index difference $\Delta_2$ of not less than 0.2%; and
   a fusion bonded portion bonding the another optical waveguide to the at least one end, the fusion bonded portion being heated to reduce mismatch of said core/clad equivalent refractive index differences $\Delta$ of the optical waveguides and mismatch of mode field diameters of the optical waveguides.
7. An optical waveguide module comprising:
   an optical waveguide configured as recited in claim 1; and
   a sheet to which said optical waveguide is fixed, the optical waveguide being wired on the sheet.
8. An optical waveguide module comprising:
   an optical waveguide configured as recited in claim 1; and
   at least two sheets, said optical waveguide being fixed between the at least two sheets and being wired therebetween.
9. The optical waveguide module according to claim 7, wherein said optical waveguide comprises multiple optical waveguides fixed to the sheet and being wired.
10. The optical waveguide module according to claim 7, wherein said sheet comprises a material having flexibility.
11. A method of forming an optical waveguide comprising:
    providing a silica glass optical fiber having a core and a clad;
    heating a specified portion of said silica glass optical fiber to a high temperature;
    bending said portion of the silica glass fiber at the high temperature so as to make a bend radius of the portion become smaller than a radius of a fracture limit of the silica glass optical fiber at a room temperature; and
    providing said portion of the silica glass optical fiber to have a core/clad equivalent refractive index difference of silica glass optical fiber within a range from not less than 0.8% to not more than 3.5%.

12. The method of forming an optical waveguide according to claim 11, wherein said portion of said silica glass fiber is heated and bend at the temperature within a range from not less than a folding point of the silica glass optical fiber to not more than a softening point of the silica glass optical fiber.

13. The optical waveguide module according to claim 8, wherein said optical waveguide comprises multiple optical waveguides fixed between the at least two sheets and being wired.

14. The optical waveguide module according to claim 8, wherein a material of said sheet has flexibility.

15. The optical waveguide module according to claim 9, wherein said sheet comprises a material having flexibility.

16. The optical waveguide according to claim 1, wherein an outer diameter of the silica glass optical fiber at the bend is substantially the same as the outer diameter of the silica glass optical fiber at a portion other than the bend.

17. An optical waveguide comprising:
a core and a clad providing a core/clad equivalent refractive index difference of 2.5%, and having an outer diameter of 80 μm,
a bend provided in a specified portion of the optical waveguide, said bend having specified bend radius of 1 mm, and
an angle of bend of 90°, the bend being in an initial distortion free state.

18. The optical waveguide of claim 1, wherein the core/clad equivalent refractive index difference is 1.0% to 3.0%.

19. The optical waveguide of claim 1, wherein the core/clad equivalent refractive index difference is 0.8% to 3%.

* * * * *